United States Patent [19]
Linzer

[11] Patent Number: 5,926,220
[45] Date of Patent: Jul. 20, 1999

[54] COMPOSITE DIGITAL VIDEO DECODER AND DIGITAL COMPRESSOR

[75] Inventor: Elliot N. Linzer, Bronx, N.Y.

[73] Assignee: C-Cube Microsystems, Inc., Milpitas, Calif.

[21] Appl. No.: 08/878,381

[22] Filed: Jun. 18, 1997

Related U.S. Application Data

[51] Int. Cl.⁶ .............................. H04N 9/66; H04N 11/02
[52] U.S. Cl. ......................... 348/391; 348/453; 348/638; 348/641
[58] Field of Search .................................... 348/391, 393, 348/396, 397, 398, 453, 454, 455, 638, 641; 386/27, 33, 34, 44; 329/304, 306, 307

[56] References Cited

U.S. PATENT DOCUMENTS

| | | | |
|---|---|---|---|
| 4,633,187 | 12/1986 | Nishimura | 348/641 |
| 5,097,321 | 3/1992 | Stern | 348/641 |

*Primary Examiner*—Howard Britton
*Attorney, Agent, or Firm*—Proskauer Rose LLP

[57] ABSTRACT

In accordance with an illustrative embodiment of the invention, a composite video signal is decoded as follows. A filtered and optionally re-sampled luminance component is obtained by vertical low-pass filtering the composite video signal using a vertical low-pass filter. The vertical low-pass filter may also be a re-sampler so that the output is optionally a filtered and re-sampled luminance signal. (Note that the use of a single vertical low-pass filter and re-sampler is more efficient than the prior art which uses a luma comb filter followed by a vertical filter/re-sampler to obtain the filtered and optionally re-sampled luminance component). Filtered and re-sampled chrominance components are obtained by first vertically high-pass filtering and re-sampling the composite video signal using a vertical high pass filter/re-sampler. This results in filtered and re-sampled but still quadrature modulated chroma signals. These signals are then demodulated and horizontal low-pass filtered to obtain separate filtered and re-sampled chroma components. (Note this process is more efficient than the prior art which utilizes a chroma comb filter, a demodulator, and a vertical filter/re-sampler to obtain the filtered and re-sampled chroma components). In short, the present invention eliminates the need to directly obtain the Y, U, and V components and then vertically filter and re-sample the Y, U, and V components. Instead, according to the invention, the vertically filtered and re-sampled Y, U, and V components are directly obtained.

15 Claims, 6 Drawing Sheets

COMPOSITE DIGITAL VIDEO DECODER AND DIGITAL COMPRESSOR

FIELD OF THE INVENTION

The present invention relates to a system and method for decoding a composite digital video signal into individual filtered and re-sampled luminance (Y) and chrominance (U and V) components and for compressing (e.g., using MPEG-2) the individual filtered and re-sampled components to form a compressed digital video bitstream.

BACKGROUND OF THE INVENTION

A color video signal is typically displayed as superimposed red, green and blue signals. The red, green and blue signals are typically derived by means of a linear transformation from luminance (Y) and chrominance (U and V) components.

Some formats of professional video tapes store the component Y, U, and V digital signals separately. Also, commonly used standards for uncompressed digital video (e.g., CCIR 601) and compressed digital video (e.g., JPEG, MPEG 1 and MPEG 2, DVC) also represent the components separately. The separate digital components may be time-multiplexed, and may share some auxiliary information (e.g., time codes and closed-caption information for uncompressed video, and motion vectors or quantisation matrices for compressed video), but the signals themselves are independent; some bits are used for the Y signal, some for the U signal, and some for the V signal.

Video may also be represented in composite form; e.g., NTSC or PAL. A composite video signal is generated by quadrature modulating the chrominance components and then adding them to the luminance component. The result is called a composite video signal. Composite video signals are used in (analogue) broadcast and professional and home video tapes. A discussion of composite video encoding (converting component video into composite video) and decoding (converting composite video into component video) can be found in "A Technical Introduction To Digital Video", Charles A. Poyton, John Wiley & Sons, Inc. 1996. Such a discussion can also be found in "Digital Video; An Introduction to MPEG-2", Barry Haskell, et al. Chapman & Hall, 1997.

To convert a composite video signal into a compressed digital video signal, it is composite decoded (to obtain separate Y, U and V signals). The individual component signals are then compressed using, for example MPEG-1 or MPEG-2 or motion JPEG. The conversion from analog to digital can occur before or after composite decode.

Composite Encoder

A simplified block diagram of a composite encoder is shown in FIG. 1. The encoder 10 receives the component signals, Y, U, V as its inputs on lines 7, 8, and 9. The input chroma signals U and V are low-pass filtered using the low-pass filters 12 and 14. The filter outputs are then quadrature modulated using the modulators 16 and 18 with a subcarrier at frequency Wsc.

$$Fsc = \frac{Wsc}{2\pi} \tag{1}$$

The quadrature modulated chrominance components are then added to the luma signal Y by two adders 19 and 20. The output on line 21 is a composite video signal. The subcarrier modulation frequency Fsc is an odd multiple of half the line frequency, Fl (the number of lines of video per unit time); i.e., $$Fsc = (m + \tfrac{1}{2})Fl \tag{2}$$

when m is an integer.

For example, in the case of the NTSC video format, Fl is 2250/143 kHz=15.73 khz and Fsc is 227.5 Fl=315/88 Mhz= 3.58 Mhz.

The in-phase carrier cos(Wsc·t) and the quadrature phase carrier sin (Wsc·t) are generated by the subcarrier generator 22. The filtered U component is modulated onto the in-phase carrier. The filtered V component is modulated onto the quadrature phase carrier.

Composite Decoder

A conventional composite video decoder 30 is shown in FIG. 2. The input is a composite video signal on line 31. The composite video is sent to two vertical comb filters 32, and 34; a luma comb filter 32 produces the output luma signal Y and a chroma comb filter 34 produces the quadrature modulated chroma components. A subcarrier regenerator 36 is then used to regenerate the chroma subcarrier. The modulated chrominance components are demodulated by multiplying by the regenerated chroma subcarrier and low-pass filtering. Specifically, the output of the chroma comb filter 34 is multiplied by the in-phase carrier cos(Wsc·t) by multiplier 38 and horizontal low-pass filtered by filter 39 to obtain the U component. The output of the chroma comb filter 34 is multiplied by the quadrature phase carrier sin (Wsc·t) using the multiplier 40 and horizontal low-pass filtered by filter 41 to obtain the V component.

Digital Compressor

A conventional video pre-processor and compressor 50 is shown in FIG. 3. The input signals are the Y, U, and V components in digital form. Each input component signal is vertically low-pass filtered and re-sampled using the filters, 51, 52 and 53. It should be noted that filtering and re-sampling is not utilized in all cases. For example, in 4:2:0 MPEG-2, the luminance component is not re-sampled vertically, but the chroma components are re-sampled vertically. The luma component is typically vertically filtered for low bitrate (less than 4 mbit/sec) compression but not for high bit rate compression. The filtered and re-sampled component video undergoes additional pre-processing using the pre-processor 55 and is then compressed using the digital compressor engine 57. Illustratively, the compression engine is an MPEG-2 video compressor. In this case, the additional preprocessing may involve temporal nonlinear filtering and obtaining certain statistics relating to the frames to help the compression engine code more efficiently and may also involve frame reordering if B frames are involved.

Composite Video Decoder and Compressor

A conventional composite video decoder, pre-processor and compressor is shown in FIG. 4. A conventional composite video decoder 60 decodes the composite video (in the manner described above in connection with FIG. 2) and the component output (Y, U, V) is sent to a conventional video pre-processor and compressor 70. The pre-processor includes the filters 51, 52, 53, as well as the additional pre-processing capabilities 55. Illustratively, the compressor is an MPEG-2 compressor. The output on line 71 is an MPEG-2 bit stream in this case.

In short, according to the prior art, a composite video signal is decoded:

(1) by using a luma comb filter to obtain the luma (Y) component and then vertically filtering and (optionally) re-sampling to obtain a filtered and re-sampled luma component;

(2) by using a chroma comb filter to obtain quadrature modulated chroma components, demodulating the chroma component to obtain separated U and V chroma components, and then vertically filtering and re-sampling the separate chroma components to obtain vertically filtered and re-sampled chroma components.

After this, the filtered and optionally re-sampled luma component and the filtered and resampled chroma components can be compressed using for example an MPEG-2 compressor.

OBJECTS OF THE INVENTION

It is an object of the invention to provide a method and system for decoding a composite video signal to obtain a filtered and optionally re-sampled luminance component and filtered and re-sampled chrominance components in a simpler and more efficient manner than in the above-described prior art. It is also an object of the invention to digitally compress the filtered and optionally re-sampled luminance component and the filtered and re-sampled chrominance components.

SUMMARY OF THE INVENTION

In accordance with an illustrative embodiment of the invention, a composite video signal is decoded as follows. A filtered and optionally re-sampled luminance component is obtained by vertical low-pass filtering the composite video signal using a vertical low-pass filter. The vertical low-pass filter may also be a re-sampler so that the output is optionally a filtered and re-sampled luminance signal. (Note that the use of a single vertical low-pass filter and re-sampler is more efficient than the prior art which uses a luma comb filter followed by a vertical filter/re-sampler to obtain the filtered and optionally re-sampled luminance component). Filtered and re-sampled chrominance components are obtained by first vertically high-pass filtering and re-sampling the composite video signal using a vertical high pass filter/re-sampler. This results in filtered and re-sampled but still quadrature modulated chroma signals.

These signals are then demodulated and horizontal low-pass filtered to obtain separate filtered and re-sampled chroma components. (Note this process is more efficient than the prior art which utilizes a chroma comb filter, a demodulator, and a vertical filter/re-sampler to obtain the filtered and re-sampled chroma components).

In short, the present invention eliminates the need to directly obtain the Y, U, and V components and then vertically filter and re-sample the Y, U, and V components. Instead, according to the invention, the vertically filtered and re-sampled Y, U, and V components are directly obtained.

The filtered and re-sampled Y, U, and V components are then compressed using for example an MPEG-2 compressor. Illustratively, the vertical re-sampling of the modulated chrominance components results in chrominance signals having half the vertical resolution of the input signal. This is especially useful in the case of MPEG-2 4:2:0 format which is defined to allow for 2:1 vertical re-sampling (actually subsampling) of the chrominance to achieve a bit rate of 4 Mbits/sec in addition to the normal 2:1 horizontal chrominance subsampling of CCIR601. (It should be noted that in some cases such as MPEG 4:2:2 format the vertical subsampling is omitted.)

DETAILED DESCRIPTION OF THE INVENTION

Figure 5:
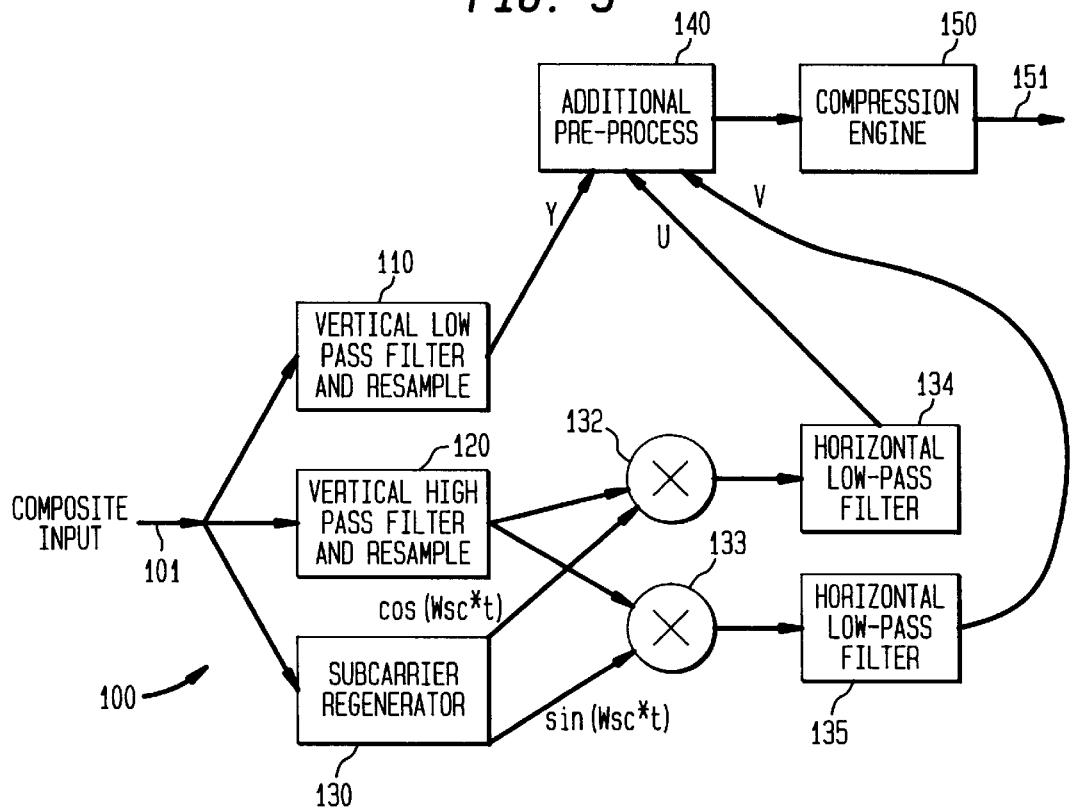
FIG. 5 schematically illustrates a composite video decoder and compressor in accordance with an illustrative embodiment of the invention.

A composite video decoder and compressor 100 in accordance with an illustrative embodiment of the present invention is shown in FIG. 5. The input signal on line 101 is a composite video signal in digital form. The composite video input signal is processed by the filters 110 and 120. The filter 110 is a vertical low-pass filter and re-sampler which outputs the vertically filtered and re-sampled Y component. (at should be noted that the use of re-sampling in combination with vertical low-pass filtering is optional.) The filter 120 is a vertical high-pass filter and re-sampler. The output of the filter 120 is the vertically filtered and re-sampled, but still quadrature modulated chrominance components.

A subcarrier regenerator 130 generates the in-phase carrier cos(Wsc·t) and quadrature phase carrier sin(Wsc·t). To complete the demodulation, the output of the filter 120 is multiplied by the in-phase carrier using multiplier 132. The resulting signal is horizontal low-pass filtered by the filter 134 to obtain the vertically filtered and re-sampled U component. Similarly, the output of the filter 120 is multiplied by the quadrature phase carrier using multiplier 133. To complete the demodulation, the resulting signal is horizontal low-pass filtered by the filter 135 to obtain the vertically filtered and re-sampled V component.

The vertically filtered and re-sampled Y, U, and V components are then input to a preprocessor circuit 140 for additional preprocessing and then transmitted to a compression engine 150 which may be an MPEG-2 compression engine. A compressed video bit stream is output from the system 100 on line 151. It should be noted, the preprocessor 140 does not include the filters 51, 52, and 53 of FIG. 3 because the need for these filters is eliminated in the invention. Rather, the preprocessor 140 performs certain pre-compression tasks such as temporal filtering, frame reordering and obtaining of certain statistics with respect to particular frames to aid in compression.

Figure 4:
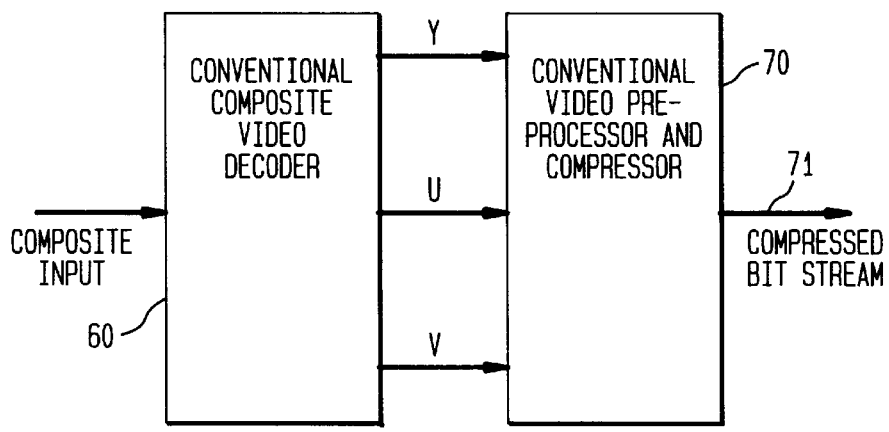
FIG. 4 schematically illustrates a conventional composite video decoder, pre-processor and digital compressor.

To understand why the inventive system 100 shown in FIG. 5 performs essentially the same function as the conventional system shown in FIG. 4, we will look at the function of the conventional composite decoder 60 and pre-processor and compressor 70 of FIG. 4 in more detail.

Let T0 be the time at the beginning of a video field, let Tx be the time from the beginning of a video line until time t, and, let l be the line number of the video at time t. Then $$Wsc \cdot t = Wsc\left(T0 + \frac{l}{Fl} + Tx\right) = Wsc(T0 + Tx) + \left(m + \frac{1}{2}\right)l2\pi \quad (3)$$

where m is an integer. We can write the modulated chroma signal as $$U(t) \cos (Wsc \cdot t) + V(t) \sin (Wsc \cdot t) \quad (4)$$

which with simple trigonometric identities can be shown to equal $$\cos (\pi l)(U(t) \cos (Wsc(T0+Tx)) + V(t) \sin (Wsc(T0+Tx))) \quad (5)$$

In other words, we can view the quadrature modulation of the chroma signal as vertical modulation at a frequency equal to ½ inverse vertical sample spacing (the maximum vertical digital frequency) and horizontal quadrature modulation at Fsc with the phase reset to Wsc·T0 at the beginning of each line.

Figure 6:
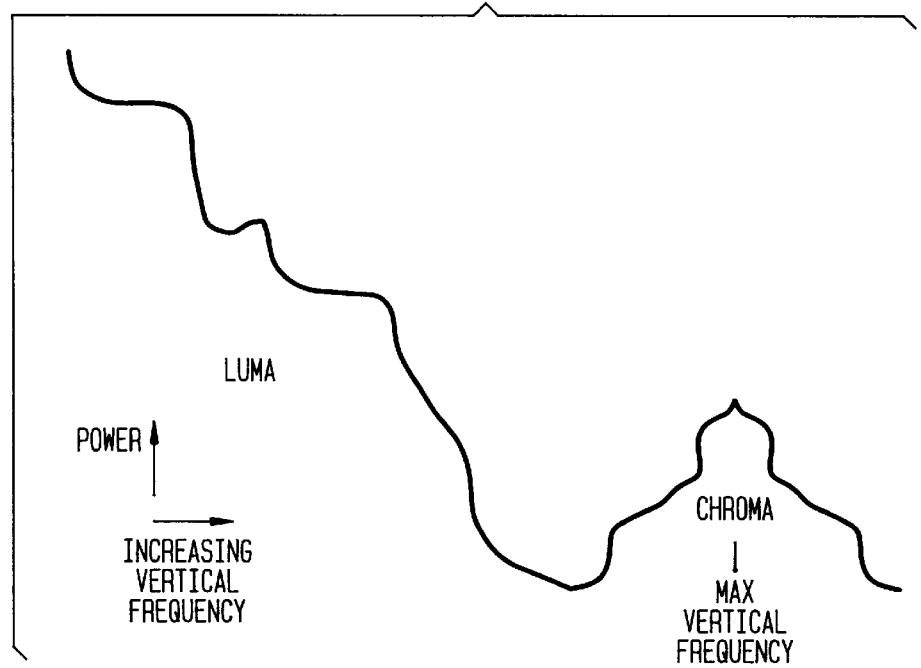
FIG. 6. is a plot of the vertical spectrum of a typical composite video signal.

The Y, U, and V signals are inherently low-pass vertically and/or have been vertically low-pass filtered. Modulating the chroma by the maximum vertical frequency moves the chroma power to the high vertical frequencies. In FIG. 6, there is shown the vertical spectrum of a typical composite signal. Note that the luma power is still in the lower vertical frequencies, but the chroma power has shifted to the higher frequencies and is centered on the maximum vertical frequency.

Figure 1:
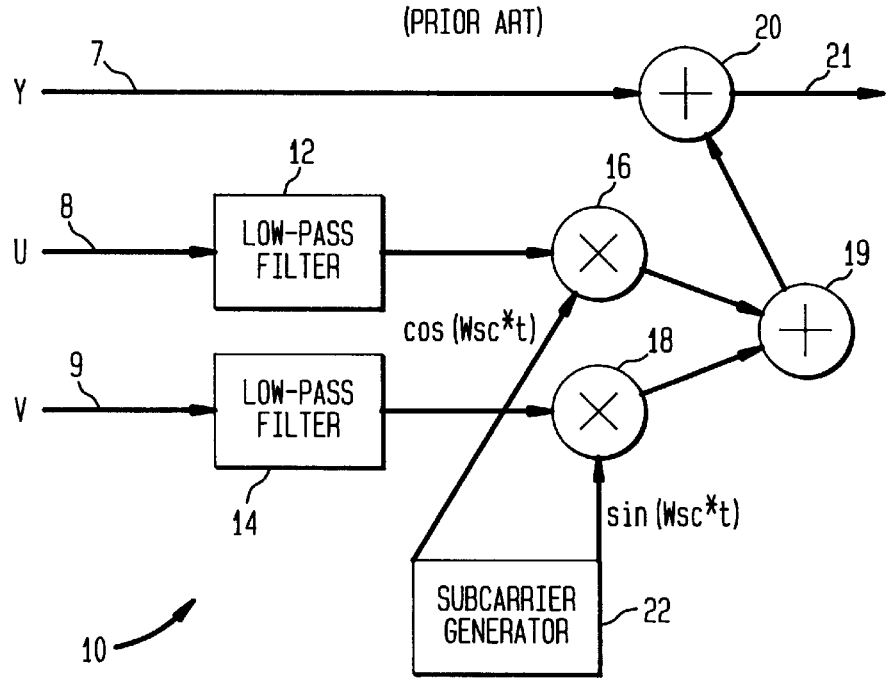
FIG. 1 schematically illustrates a conventional composite video encoder.
Figure 2:
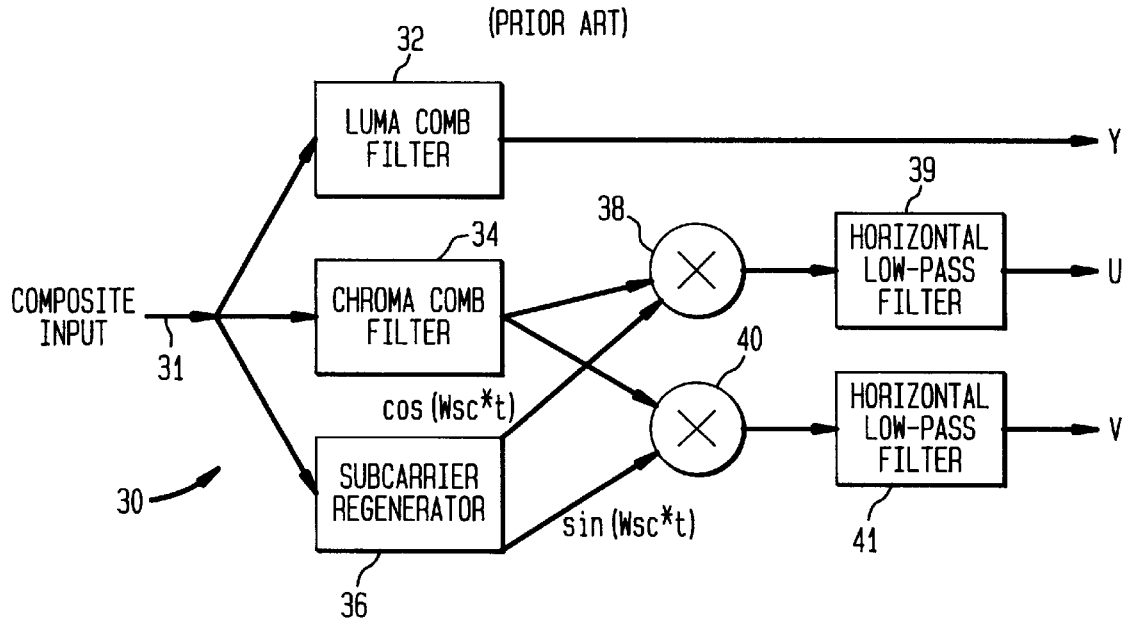
FIG. 2 schematically illustrates a conventional composite video decoder.
Figure 7:
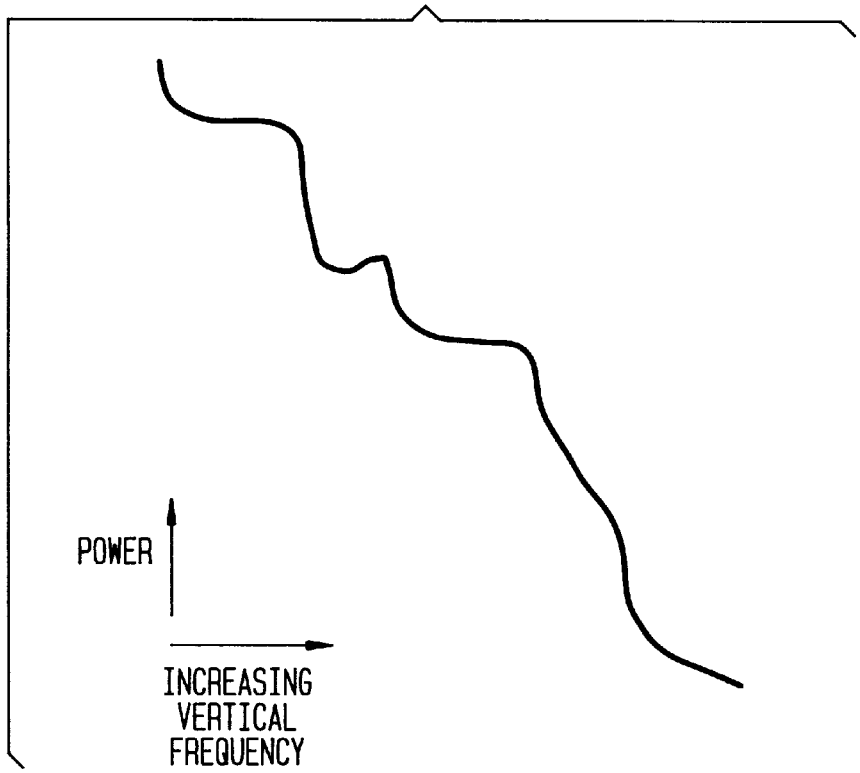
FIG. 7 is a plot of the vertical spectrum of a luma signal separated from a typical composite video signal.
Figure 8:
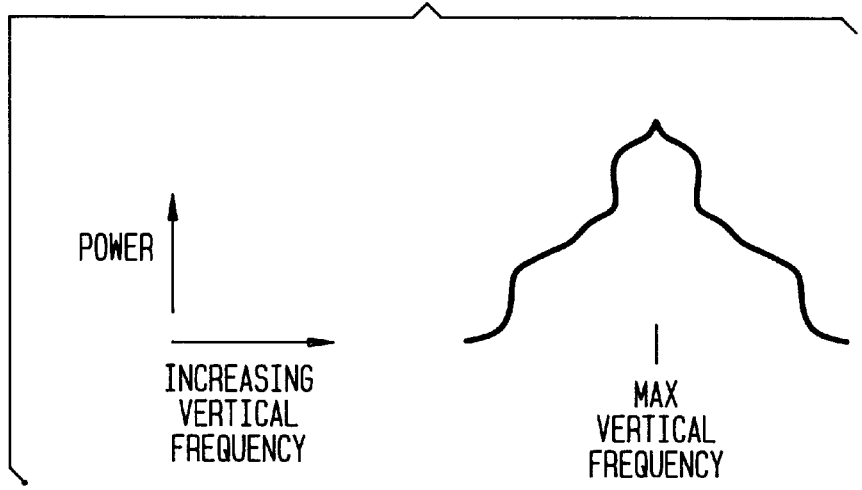
FIG. 8 is a plot of the vertical spectrum of a chroma signal separated from a typical composite video signal.
Figure 9:
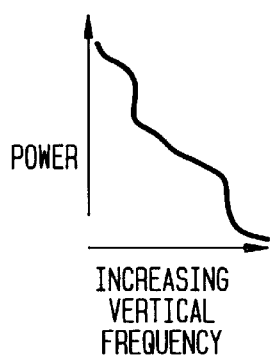
FIG. 9 is a plot of the vertical spectrum of demodulated chroma (U+V) of a typical composite video signal.

The luma comb filter 32 (in FIG. 2) selects the lower vertical frequencies; the resulting spectrum is shown in FIG. 7. The chroma comb filter 34 (in FIG. 2) selects the higher vertical frequencies and rejects the lower frequencies; the resulting spectrum is shown in FIG. 8. After quadrature demodulation, the chroma signal is brought back to baseband, as shown in FIG. 9. (Note that after demodulation, the U and V are separated from each other; in FIG. 9 we have shown the combined power in U and V.)

Figure 3:
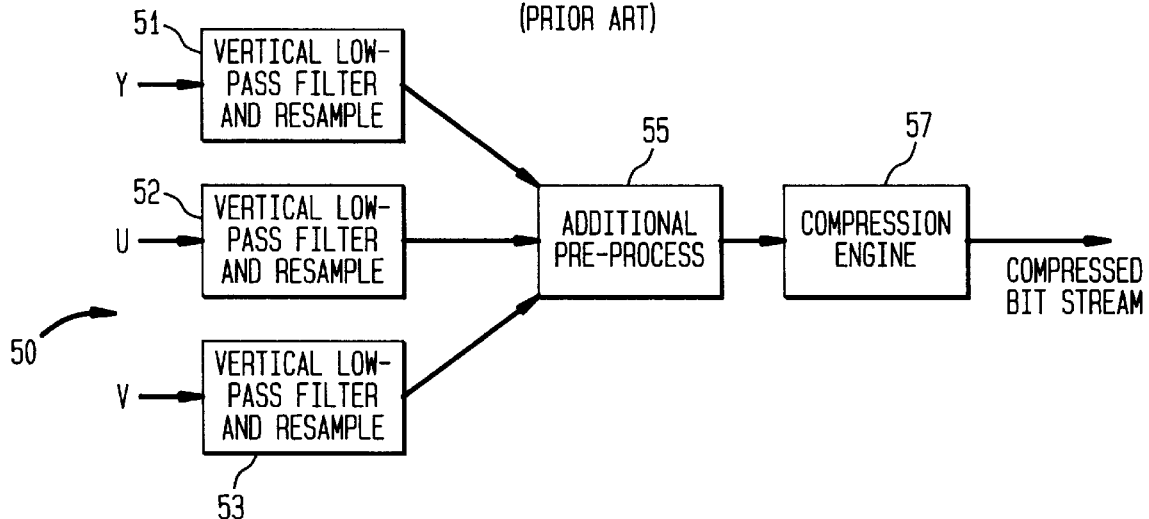
FIG. 3 schematically illustrates a conventional video pre-processor and compressor.
Figure 10:
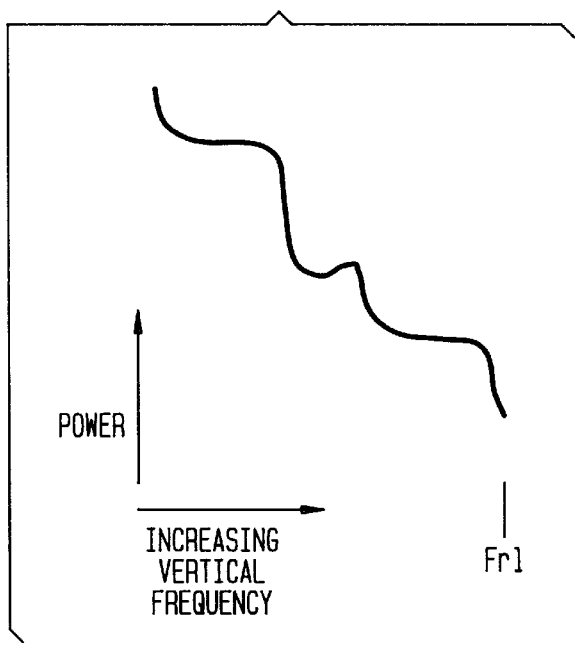
FIG. 10 is a plot of the vertical spectrum of a separated and vertically filtered luma component of a typical composite video signal.

We now consider the preprocessing filters 51, 52 and 53 of FIG. 3. The vertical low-pass filter and re-sampler 51 connected to the Y input in the prior art pre-processor and compressor of FIG. 3 rejects (or attenuates) the higher vertical frequencies of the luma signal and re-samples (this filtering and re-sampling may be embodied in a single step, but we can conceptually view the steps as distinct). The spectrum of the signal before such filtering is shown in FIG. 7 and the spectrum of the filtered luma is shown in FIG. 10. In this example, all frequencies above Frl are rejected, where Frl is the luma rejection frequency threshold. In an illustrative example, Frl is two thirds the maximum vertical frequency. Looking at FIG. 6 and FIG. 10, we see that we could produce the luma of FIG. 10 simply by vertically filtering the composite signal (FIG. 6) and rejecting all frequencies above Frl. Therefore, the filtered luma signal at the output of the filter 51 of FIG. 3 and the filtered luma signal produced according to the invention at the output of filter 110 of FIG. 5 are substantially the same.

Figure 11:
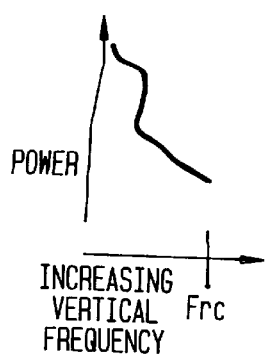
FIG. 11 is a plot of the vertical spectrum of separated and vertically filtered chroma components of a typical composite video signal.
Figure 12:
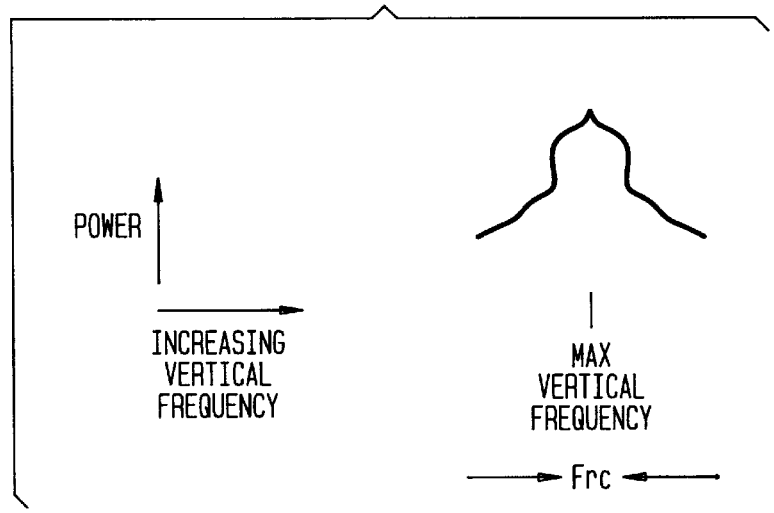
FIG. 12 is a plot of the spectrum of a vertically high-pass filtered typical composite video signal with all frequencies below the maximum vertical frequency minus Frc rejected.

The vertical low-pass filter and re-samplers 52, 53 connected to the U and V inputs in FIG. 3 reject (or attenuate) the higher vertical frequencies of the chroma components and re-sample. (This filtering and re-sampling may be embodied in a single step, but we can conceptually view the steps as distinct.) The spectrum of the sum of the U and V signals before filtering by filters 52 and 53 of FIG. 3 is shown in FIG. 9, and the filtered chroma as a result of filters 52 and 53 is shown in FIG. 11. In the example, all frequencies above Frc are rejected, where Frc is the chroma rejection frequency threshold. In an illustrative example, Frc is one third the maximum vertical frequency. If the vertical high-pass filter 120 in FIG. 5 rejects all frequencies below the maximum vertical frequency minus Frc, then the spectrum of the output is as shown in FIG. 12. After the demodulators in FIG. 5 bring the signal back to baseband, the signal is the same as in FIG. 11. Therefore, the filtered chroma components in FIG. 3 (as a result of processing by filter 51) and the vertically filtered and re-sampled chroma components produced according to the invention as shown in FIG. 5 are substantially the same.

If the re-sampled chroma lines are co-located with the original lines, then the phase of the chroma demodulators 132, 133 in FIG. 5 at the beginning of each line will be πl+WscT0, where l is the line number in the original (composite) signal. In other words, the only difference between the demodulation in FIG. 4 (conventional system) and the demodulation in FIG. 5 (inventive system) is that in the first case every line is demodulated and in the second case only the re-sampled (typically fewer) lines are demodulated.

If the re-sampled chroma lines are not co-located with the original video lines, then the phase of the chroma demodulators 132, 133 in FIG. 5 at the beginning of each line will be πl+WscT0, where l, the position of the re-sampled chroma lines in units of the original chroma lines, will in general, differ from the initial phase at the beginnings of lines for the demodulators of FIG. 4, and will not be an integer. This occurs, for example, in MPEG 4:2:2 to 4:2:0 conversion, where the 4:2:0 lines are not co-located with the 4:2:2 lines.

Figure 13:
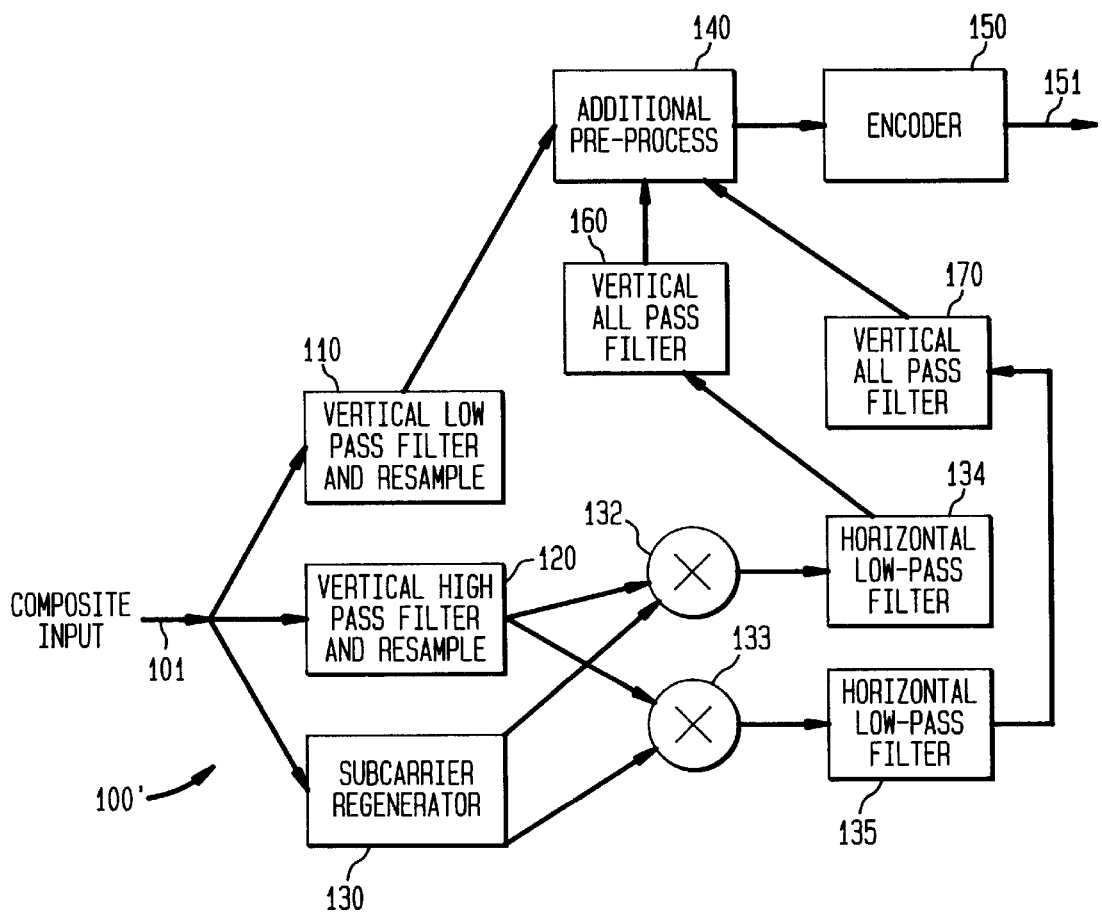
FIG. 13 is schematically illustrates a composite video decoder and compressor for 4 Fsc sampling, in accordance with an alternative illustrative embodiment of the invention.

When 4 Fsc sampling is used, it is desirable for the initial phase at the beginning of each line to be either 0 or π so that the demodulation coefficients will be 0,+1 or −1. In that case, the final position of the chroma lines differs from the original scan lines. Therefore, if 4 Fsc sampling is used, it may be desirable to use the demodulator and compressor of FIG. 13, where the chroma is first re-sampled (using the filter 120) to be co-located with the original scan lines, demodulated, and then shifted in position with an all-pass filter. Thus, in FIG. 13, the composite decoder and compressor 100' for 4 Fsc sampling includes the vertical all-pass filters 160 and 170 which are not included in the composite video decoder and compressor 100 of FIG. 5. Specifically, the all-pass filter 160 filters the U component before it is inputted to the preprocessor 140. Similarly, the all-pass filter 170 filters the V component before it is inputted to the preprocessor 140.

Finally, the above-described embodiments of the invention are intended to be illustrative only. Numerous alternative embodiments may be devised by those skilled in the art without departing from the scope of the following claims.

The claimed invention is:

1. A method for decoding a composite video signal formed from a signal luminance component and first and second chrominance components, said method comprising of steps of:

filtering said composite video signal with a vertical low-pass filter to obtain a filtered luminance component;

filtering said composite video signal with a vertical high-pass filter and re-sampler to obtain filtered and re-sampled quadrature modulated chrominance components; and multiplying said filtered and re-sampled quadrature modulated chrominance components by an in-phase and quadrature carrier and horizontally low-pass filtering signals resulting from said multiplication to obtain first and second filtered and re-sampled chrominance components.

2. The method of claim 1 further comprising the step of compressing said filtered luminance component and said first and second filtered and re-sampled chrominance components.

3. The method of claim 1 wherein said vertical high-pass filter and re-sampler outputs said filtered and re-sampled quadrature modulated chrominance components with half the vertical resolution of said composite video signal.

4. A system for converting a composite video signal into a compressed digital video signal, said composite video signal having been formed from a luminance component and first and second chrominance components, said system comprising:

a luminance separator for separating a filtered luminance component from said composite video signal;

a vertical high-pass filter and re-sampler for vertically high-pass filtering and re-sampling said composite video signal to produce vertically high-pass filtered and re-sampled quadrature modulated chrominance components;

a demodulator for demodulating said vertically high-pass filtered and re-sampled quadrature modulated chrominance components to obtain first and second vertically filtered and re-sampled chrominance components; and a compressor for compressing said filtered luminance component and said vertically filtered and re-sampled first and second chrominance components to form a compressed digital video signal.

5. The system of claim 4 wherein said luminance separator comprises a vertical low-pass filter.

6. The system of claim 4 wherein said luminance separator comprises a vertical low-pass filter and re-sampler.

7. The system of claim 4 wherein said vertically high-pass filtered and re-sampled quadrature modulated chrominance components have one half the vertical resolution of said composite video signal.

8. The system of claim 4 wherein said demodulator comprises first and second multipliers for multiplying said vertically high-pass filtered and re-sampled quadrature modulated chrominance components with in-phase and quadrature carrier signals, and first and second horizontal low-pass filters for filtering the outputs of said first and second multipliers, respectively, to obtain said first and second filtered and re-sampled chrominance components.

9. The system of claim 8, further comprising first and second vertical all pass filters connected to said first and second horizontal low-pass filters respectively in order to co-locate chrominance scan lines of said first and second filtered and re-sampled chrominance components with scan lines of said composite video signal.

10. The system of claim 4, wherein said compressor in an MPEG-2 compressor.

11. A decoder for a digital composite video signal comprising:

a vertical high-pass filter and re-sampler for vertically high-pass filtering and re-sampling said composite video signal to obtain vertically filtered and re-sampled quadrature modulated chrominance components; and a demodulator for quadrature demodulating and said vertically filtered and re-sampled quadrature modulated chrominance components to obtain first and second vertically filtered and re-sampled chrominance components.

12. The decoder of claim 11 wherein said vertically filtered and re-sampled chrominance components have one-half the vertical resolution of said composite video signal.

13. The decoder of claim 11 further including a luminance separator for separating a luminance component from said composite video signal.

14. A system for converting a composite video signal into a compressed digital video signal comprising:

a luminance separator for separating a filtered luminance component from said composite video signal;

a vertical high-pass filter for vertically high-pass filtering said composite video signal to produce vertically high-pass filtered and quadrature modulated chrominance components;

a demodulator for demodulating said vertically high-pass filtered and quadrature modulated chrominance components to obtain first and second vertically filtered chrominance components; and a compressor for compressing said filtered luminance component and said first and second vertically filtered chrominance components to form a compressed digital video signal.

15. The system of claim 14 wherein said composite video signal is a digital composite video signal.

* * * * *